(12) United States Patent
Beon et al.

(10) Patent No.: US 10,121,418 B2
(45) Date of Patent: Nov. 6, 2018

(54) APPARATUS AND METHOD FOR CONTROLLING VIDEO WALL

(71) Applicant: SAMSUNG ELECTRONICS CO., LTD., Suwon-si, Gyeonggi-do (KR)

(72) Inventors: Nam-kyun Beon, Seoul (KR); Min-jung Kim, Seoul (KR); Oh-yun Kwon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 17 days.

(21) Appl. No.: 14/876,955

(22) Filed: Oct. 7, 2015

(65) Prior Publication Data

US 2016/0155389 A1    Jun. 2, 2016

(30) Foreign Application Priority Data

Nov. 28, 2014    (KR) .......................... 10-2014-0169179

(51) Int. Cl.
 *G09G 3/34* (2006.01)
 *G06F 3/14* (2006.01)
 *G06F 3/00* (2006.01)
 *G06F 3/0489* (2013.01)

(52) U.S. Cl.
 CPC ....... *G09G 3/3406* (2013.01); *G06F 3/04897* (2013.01); *G06F 3/1446* (2013.01); *G09G 2320/0233* (2013.01); *G09G 2320/062* (2013.01); *G09G 2320/0626* (2013.01); *G09G 2320/0693* (2013.01)

(58) Field of Classification Search
None
See application file for complete search history.

(56) References Cited

U.S. PATENT DOCUMENTS

| | | | |
|---|---|---|---|
| 6,791,608 B1 | 9/2004 | Miyazawa | |
| 7,119,923 B1 | 10/2006 | Iwaki | |
| 7,133,070 B2 | 11/2006 | Wheeler et al. | |
| 7,301,534 B2 | 11/2007 | Runolinna | |
| 7,728,845 B2 | 6/2010 | Holub | |
| 8,331,721 B2 | 12/2012 | Kasperkiewicz | |
| 2005/0128313 A1 | 6/2005 | Kobayashi | |
| 2008/0218501 A1 | 9/2008 | Diamond | |
| 2010/0328336 A1* | 12/2010 | Si | G09G 3/3666 345/589 |
| 2012/0054634 A1 | 3/2012 | Stone et al. | |

(Continued)

FOREIGN PATENT DOCUMENTS

| | | |
|---|---|---|
| EP | 1 365 383 | 6/2011 |
| JP | 2004-364163 | 12/2004 |
| JP | 2012-088551 | 5/2012 |

*Primary Examiner* — Joseph Haley
*Assistant Examiner* — Emily Frank
(74) *Attorney, Agent, or Firm* — Nixon & Vanderye P.C.

(57) ABSTRACT

A video wall control device is provided in which a data processor is configured to determine a backlight control signal controlling an intensity of light supplied by at least one backlight unit among a plurality of backlight units based on image data obtained by capturing an image of a video wall device including a plurality of display panels and the plurality of backlight units supplying the light to each of the plurality of display panels, and signal transmission and reception circuitry configured to transmit the backlight control signal to the video wall device.

14 Claims, 10 Drawing Sheets

(56) References Cited

U.S. PATENT DOCUMENTS

2014/0340437 A1\* 11/2014 Kohashikawa ....... G06F 3/1446
345/694
2015/0161932 A1\* 6/2015 Kure .................... G09G 3/3426
345/690

\* cited by examiner

APPARATUS AND METHOD FOR CONTROLLING VIDEO WALL

CROSS-REFERENCE TO RELATED APPLICATION

This application is based on and claims priority under 35 U.S.C. § 119 to Korean Patent Application No. 10-2014-0169179, filed on Nov. 28, 2014, in the Korean Intellectual Property Office, the disclosure of which is incorporated by reference herein in its entirety.

BACKGROUND

1. Field

The disclosure relates to an apparatus and method for controlling a video wall, for example, to an apparatus and method for controlling a video wall capable of adjusting luminances among a plurality of display panels through control of a backlight unit.

2. Description of Related Art

A video wall device is a device configured to use a plurality of display devices as one integrated display device. That is, a video wall device includes a plurality of display devices, and the plurality of display devices form one large screen. A video wall device is also referred to as a large format display (LFD) device.

However, video wall devices tend to have color deviation between the display devices that is visible to the naked eye. This is because luminance characteristics and chromaticity characteristics between the display devices are different. Further, the color deviation gradually increases as time passes. In order to minimize or reduce the color deviation, calibration of equalizing chromaticities and luminances among the display devices is performed. Examples of the color calibration for adjusting the chromaticity include gamma correction, non-uniformity correction, color gamut mapping, white balance correction, etc. The luminances among the display devices may be adjusted before or after the color calibration.

SUMMARY

An apparatus and method for controlling a video wall capable of adjusting luminances among a plurality of display panels through control of a backlight unit are provided.

Additional aspects will be set forth in part in the description which follows and will be apparent from the description.

According to an example, a video wall control device, includes: a data processor configured to determine a backlight control signal for controlling an intensity of light supplied by at least one backlight unit among a plurality of backlight units based on image data obtained by capturing an image of a video wall device including a plurality of display panels and the plurality of backlight units supplying the light to each of the plurality of display panels; and signal transmission and reception circuitry configured to transmit the backlight control signal to the video wall device.

The data processor may obtain an initial luminance which is a luminance of each of the plurality of display panels based on the image data, and determine the backlight control signal based on the initial luminance.

The data processor may determine the backlight control signal so that a luminance of at least one display panel among the plurality of display panels is adjusted from the initial luminance to a reference luminance.

The data processor may determine one among the plurality of display panels as a reference display panel, and determine the initial luminance of the reference display panel as the reference luminance.

The reference display panel may be selected based on a selection of a user, or be selected by the data processor as a display panel having the smallest initial luminance among the plurality of display panels as the reference display panel.

The data processor may compare a difference between the initial luminances on the plurality of display panels with a threshold value, and determine the backlight control signal when the difference is greater than the threshold value.

The data processor may obtain a second luminance which is the luminance of each of the plurality of display panels based on second image data obtained by capturing a second image of the video wall device in which the at least one backlight unit is controlled based on the backlight control signal, determine whether to readjust the plurality of backlight units based on the second luminance, and when it is determined to be readjusted, determine a second backlight control signal controlling the intensity of the light supplied by at least one backlight unit among the plurality of backlight units, and the signal transmission and reception circuitry may be configured to transmit the second backlight control signal to the video wall device.

The signal transmission and reception circuitry may be configured to transmit a capturing ready signal to the video wall device so that the video supplied by the plurality of backlight units before the image of the video wall device is captured, and an operation in which the plurality of display panels display a test pattern before the image of the video wall device is captured.

The video wall control device may further include: an output configured to display backlight information which includes information on the intensity of the light supplied by the plurality of backlight units controlled based on the backlight control signal.

The video wall control device may further include: an input configured to receive an input for resetting the backlight information.

According to another example, a video wall control method includes: determining a backlight control signal controlling an intensity of light supplied by at least one backlight unit among a plurality of backlight units based on image data obtained by capturing an image of a video wall device including a plurality of display panels and the plurality of backlight units supplying the light to each of the plurality of display panels; and transmitting the backlight control signal to the video wall device.

Determining the backlight control signal may include: obtaining an initial luminance which is a luminance of each of the plurality of display panels based on the image data; and determining the backlight control signal based on the initial luminance.

The backlight control signal may be obtained so that a luminance of at least one display panel among the plurality of display panels is adjusted from the initial luminance to a reference luminance.

Determining the backlight control signal may further include: selecting one among the plurality of display panels as a reference display panel; and determining the initial luminance of the reference display panel as the reference luminance.

The reference display panel may be selected based on a selection of a user, or be selected as a display panel having the smallest initial luminance among the plurality of display panels.

Determining the backlight control signal may include: comparing a difference between the initial luminances on the plurality of display panels with a threshold value; and determining the backlight control signal when the difference is greater than the threshold value.

The video wall control method may further include: obtaining a second luminance which is the luminance of each of the plurality of display panels based on second image data obtained by capturing a second image of the video wall device in which the at least one backlight unit is controlled based on the backlight control signal; determining whether to readjust the plurality of backlight units based on the second luminance; when it is determined to be readjusted, determining a second backlight control signal controlling the intensity of the light supplied by at least one backlight unit among the plurality of backlight units; and transmitting the second backlight control signal to the video wall device by the signal transmission and reception circuitry.

The video wall control method may further include: transmitting a capturing ready signal to the video wall device so that the video wall device performs at least one of an operation of initializing the intensity of the light supplied by the plurality of backlight units before the image of the video wall device is captured, and an operation in which the plurality of display panels display a test pattern before the image of the video wall device is captured.

The video wall control method may further include: displaying backlight information including information on the intensity of the light supplied by the plurality of backlight units controlled based on the backlight control signal; and receiving an input for resetting the backlight information from a user.

BRIEF DESCRIPTION OF THE DRAWINGS

These and/or other aspects will become apparent from the following detailed description, taken in conjunction with the accompanying drawings in which like reference numerals refer to like elements, and wherein.

DETAILED DESCRIPTION

The disclosed examples may have different forms and should not be construed as being limited to the descriptions set forth herein. The examples are described below in sufficient detail to enable those of ordinary skill in the art to embody and practice the examples, and the disclosure is defined only by the scope of claims.

The terminologies used herein will be described briefly, and the examples will be described in more detail.

The terminology used herein may be general terminology which is currently widely used in consideration of functions of the examples, but may also be changed according to intentions of technicians of ordinary skill in the art, precedent, appearance of new technology, etc. Further, in specific cases, terminology arbitrarily selected by the applicant may be used, and in such cases, the meaning will be described in detail in a corresponding portion of the description. Accordingly, the terminology used herein should be defined based not simply on the names of the terminology but on meanings of the terminology as they apply to the overall context of the examples.

Figure 1:
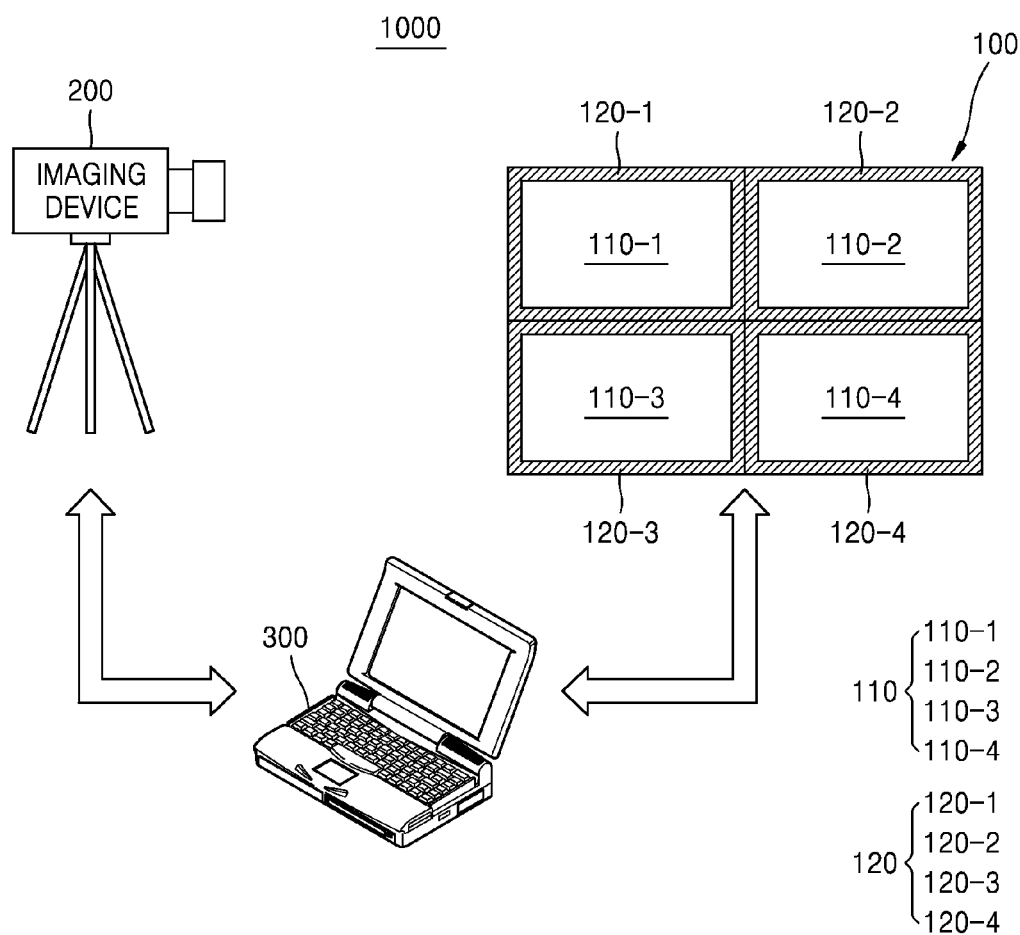
FIG. 1 illustrates a configuration of an example video wall system.

FIG. 1 illustrates a configuration of an example video wall system 1000.

Referring to FIG. 1, the video wall system 1000 may include a video wall device 100, a video wall control device 300, and an imaging device 200.

The video wall device 100 may include a plurality of display panels 110: 110-1 to 110-4, and a plurality of backlight units 120: 120-1 to 120-4. In FIG. 1, an example in which the video wall device 100 includes four display panels 110-1 to 110-4 which are arranged in a 2×2 matrix form is illustrated, but the number and an arrangement form of the display panels 110 included in the video wall device 100 are not limited. The display panels 110 may be arranged in various forms in addition to a matrix form such as a step form, a pyramid form, etc.

Each of the plurality of backlight units 120 may be configured to supply light to each display panel 110. For example, an nth backlight unit 120-$n$ which is one among the plurality of backlight units 120 may be configured to supply the light to an nth display panel 110-$n$ which is one among the plurality of display panels 110 ($n$=1, 2, 3, 4). Each backlight unit 120 may include a luminous body (not shown). The luminous body may be any of various luminous bodies such as, for example, a light emitting diode, a cold cathode fluorescent lamp, etc. Each backlight unit 120 of FIG. 1 may be an edge-type backlight which is arranged around edges of each display panel 110. FIG. 1 illustrates an example of the plurality of backlight units 120, and each backlight unit 120 may be a direct type backlight which is arranged behind each display panel 110.

Each display panel 110 may, for example, be implemented as a liquid crystal display (LCD) panel. Each display panel 110 may be implemented as various display panels to which the light from the backlight units 120 is provided in addition to an LCD display panel.

A configuration including the nth display panel 110-$n$ and the nth backlight unit 120-$n$ may be referred to as a set ($n$=1, 2, 3, 4). The video wall device 100 may include a plurality of sets, and each set may be one display device. The video wall device 100 may be a device configured to use a plurality of sets, that is, a multi display device, as one integrated display device. For example, the plurality of display panels 110 included in the video wall device 100 may form one large screen. The video wall device 100 may be referred to as a large format display (LFD) device.

The imaging device 200 may obtain image data by capturing an image of the video wall device 100, and transmit the obtained image data to the video wall control device 300. The imaging device 200 may, for example, be implemented as various devices such as a camera, a camcorder, etc. The imaging device 200 may include a high price and high quality lens such as a charge-coupled device (CCD) sensor, or may include a low price lens of lower quality.

The video wall control device 300 may be configured to control the video wall device 100, and control the imaging device 200. For example, the video wall control device 300 and the video wall device 100, and the video wall control device 300 and the imaging device 200 may be connected in a wired or wireless manner. Another example in which the imaging device 200 and the video wall control device 300 are separately configured is illustrated in FIG. 1, but the imaging device 200 may be implemented in a type integrated into the video wall control device 300. The video wall control device 300 may, for example, be implemented as various devices such as a personal computer, a server computer, a laptop computer, a portable electronic device, etc.

The video wall control device 300 may be configured to control the backlight unit 120 of the video wall device 100 based on the image data obtained by capturing the image of the video wall device 100 in the imaging device 200. An example method in which the video wall system 1000 controls the backlight unit 120 based on the image data will be described in greater detail below.

Figure 2:
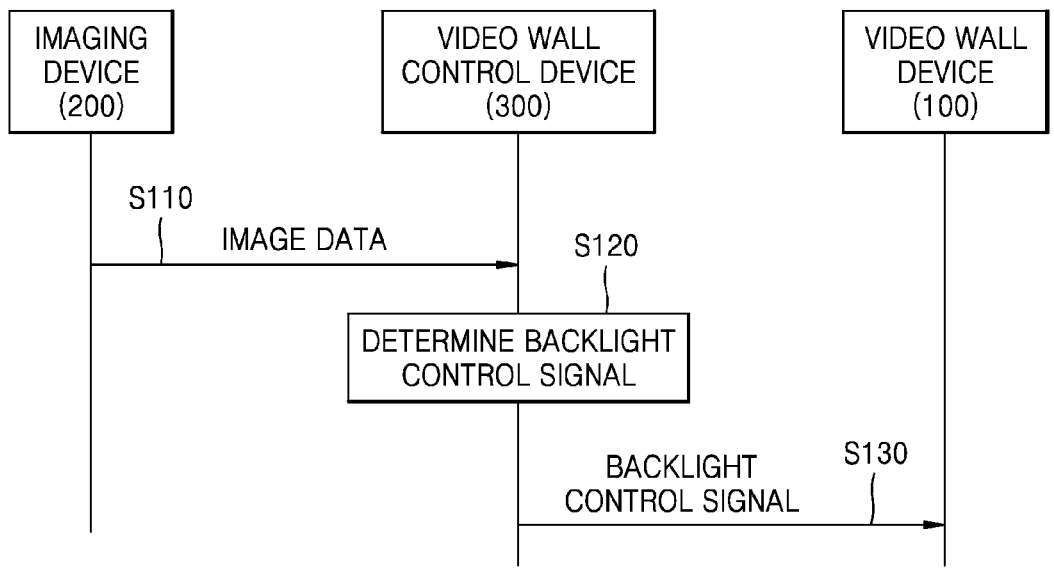
FIG. 2 is a flowchart illustrating an example method of operation of the video wall system of FIG. 1.

FIG. 2 is a flowchart illustrating an example method of operation of a video wall system 1000 of FIG. 1.

Referring to FIGS. 1 and 2, the video wall control device 300 may receive image data obtained by capturing an image of the video wall device 100 from the imaging device 200 (S110). The image data may, for example, be referred to as an image file. The image data may be two-dimensional data configured as a pixel value with respect to each of pixels which are discrete image elements. For example, each pixel may be RGB data, YUV data, etc.

The video wall control device 300 may determine a backlight control signal based on the image data (S120). The backlight control signal may, for example, be a signal for controlling an intensity of the light supplied by at least one backlight unit.

The video wall control device 300 may transmit the backlight control signal to the video wall device 100 (S130). The video wall device 100 may control the intensity of the light supplied by at least one backlight unit among the plurality of backlight units 120 to at least one corresponding display panel among the plurality of display panels 110 based on the backlight control signal. For example, the video wall control device 300 may control luminances of the plurality of display panels 110 included in the video wall device 100 by controlling the backlight units 120.

Figure 3:
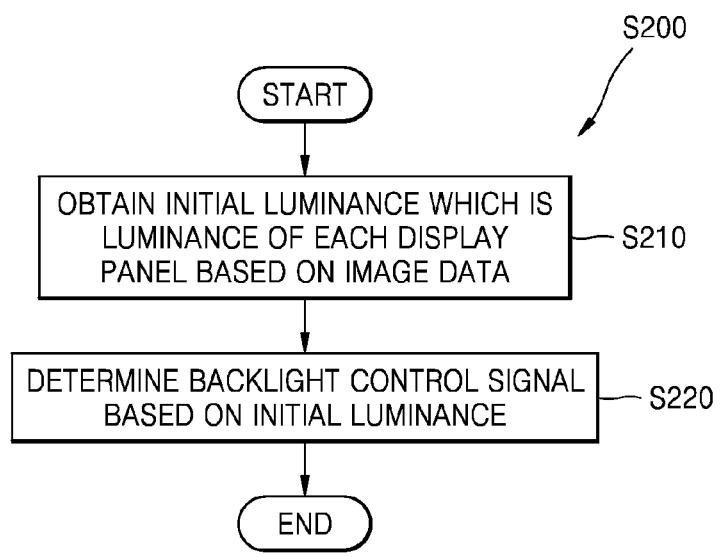
FIG. 3 is a flowchart illustrating an example method of operation of the video wall control device of FIG. 1.

FIG. 3 is a flowchart illustrating an example method of operation of a video wall control device 300 of FIG. 1.

Referring to FIGS. 1 and 3, the video wall control device 300 may obtain an initial luminance which is a luminance of each display panel 110 based on the image data (S210). The obtained initial luminance may be different for each display panel 110. The luminance of each display panel 110 may not only be an accurate intensity of the light which is emitted from each display panel 110. For example, the luminance may be a relative brightness difference degree among the display panels 110. The luminance may, for example, be a luminance inconsistency degree among the display panels 110.

In order to obtain the initial luminance, the video wall control device 300 may detect a region corresponding to each display panel 110 in the image data. Each region may be a set of pixels in the image data. The video wall control device 300 may obtain the initial luminance of each display panel 110 based on the pixel values of each region. For example, when the pixel value is the RGB data, luminance information may be detected by converting the RGB data.

The video wall control device 300 may determine the backlight control signal controlling the intensity of the light supplied by at least one backlight unit among the plurality of backlight units 120 based on the initial luminance which is the luminance of each display panel 110 (S220).

The video wall control device 300 may determine the backlight control signal so that the luminance of at least one display panel among the plurality of display panels 110 is adjusted from the initial luminance to a reference luminance. For example, the video wall control device 300 of FIG. 1 may adjust the luminances of the second and third display panels 110-2 and 110-3 among the first to fourth display panels 110-1 to 110-4 to the reference luminance. The video wall control device 300 may determine the intensity of the light to be supplied by the second backlight unit 120-2 in order to adjust the initial luminance of the second display panel 110-2 to the reference luminance. Further, the video wall control device 300 may determine the intensity of the light to be supplied by the third backlight unit 120-3 in order to adjust the initial luminance of the third display panel 110-3 to the reference luminance. The video wall control device 300 may determine the backlight control signal based on the determined result.

The reference luminance may, for example, be set by a user. The video wall control device 300 may receive the reference luminance desired by the user from the user. The video wall control device 300 may, for example, select one among the plurality of display panels 110 as a reference display panel, and determine the initial luminance of the reference display panel as the reference luminance.

The video wall control device 300 may select a display panel having the smallest initial luminance among the plurality of display panels 110 as the reference display panel. For example, the smallest initial luminance may be the reference luminance. The luminances of display panels other than the reference display panel may be adjusted to, for example, be decreased from the initial luminance to the reference luminance.

The video wall control device 300 may, for example, use one among the plurality of display panels 110 selected, for example, by the user as the reference display panel, and the initial luminance of the reference display panel may be determined as the reference luminance.

The image data may be obtained by capturing the image of the video wall device 100 while supplying the light having the maximum intensity. For example, the video wall control device 300 may determine the backlight control signal so that the luminances of display panels other than the reference display panel are adjusted from the initial luminance to the reference luminance. The video wall control device 300 may determine the decreased intensity of the light to be supplied by the backlight units corresponding to the other display panels, and determine the backlight control signal based on the determined result. When there is a display panel having a smaller initial luminance than the reference luminance among the plurality of display panels 110, the intensity of the light supplied by the backlight unit corresponding to the display panel may not be adjusted.

Figure 4:
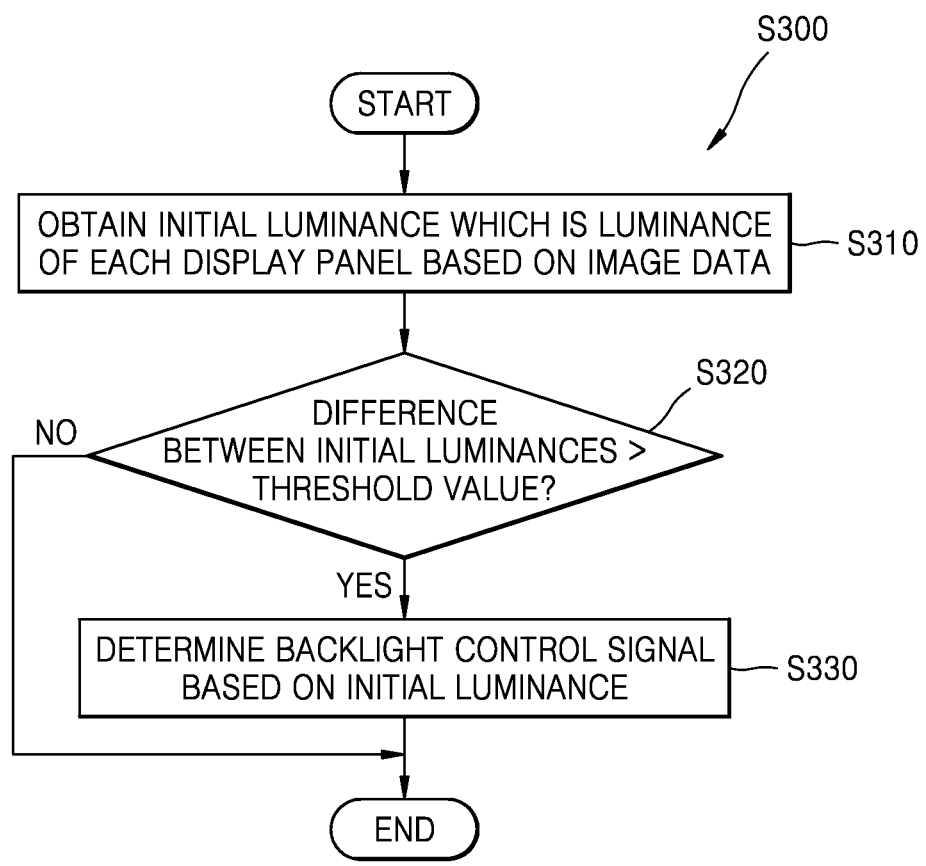
FIG. 4 is a flowchart illustrating an example method of operation of the video wall control device of FIG. 1.

FIG. 4 is a flowchart illustrating an example method of operation of a video wall control device 300 of FIG. 1. An method of operation S300 of FIG. 4 may be an example different from the method of operation S200 of the video wall control device 300 shown in FIG. 3. Because the method S200 of FIG. 3 is able to be applied to the method S300 of FIG. 4 unless otherwise described, duplicate description will be omitted.

Referring to FIGS. 1 and 4, the video wall control device 300 may obtain the initial luminance which is the luminance of each display panel 110 based on the image data (S310).

The video wall control device 300 may compare a difference between the initial luminances of the display panels 110 with a threshold value (S320). As shown in FIG. 1, when the video wall device 100 includes the first to fourth display panels 110-1 to 110-4, at least one among a difference between the initial luminances of the first and second display panels 110-1 and 110-2, a difference between the initial luminances of the first and third display panels 110-1 and 110-3, a difference between the initial luminances of the first and fourth display panels 110-1 and 110-4, a difference between the initial luminances of the second and third display panels 110-2 and 110-3, a difference between the initial luminances of the second and fourth display panels 110-2 and 110-4, and a difference between the initial luminances of the third and fourth display panels 110-3 and 110-4 may be compared with the threshold value. The threshold value may be diversely determined as a value selected, for example, by the user, or a value set as a default of the video wall control device 300.

When the difference between the initial luminances of the display panels 110 is greater than the threshold value, the video wall control device 300 may determine the backlight control signal based on the initial luminance of each display panel 110 (S330).

When the difference between the initial luminances of the display panels 110 is equal to or smaller than the threshold value, the video wall control device 300 may not determine the backlight control signal. The video wall control device 300 may determine the backlight control signal that controls the backlight units 120 such that the intensity of the light supplied by the backlight units 120 is not changed.

The video wall control device 300 may, for example, perform an operation for controlling the backlight units 120 in order to adjust the luminances of the display panels 110 only when the difference between the initial luminances of display panels 110 is greater than the threshold value.

Figure 5:
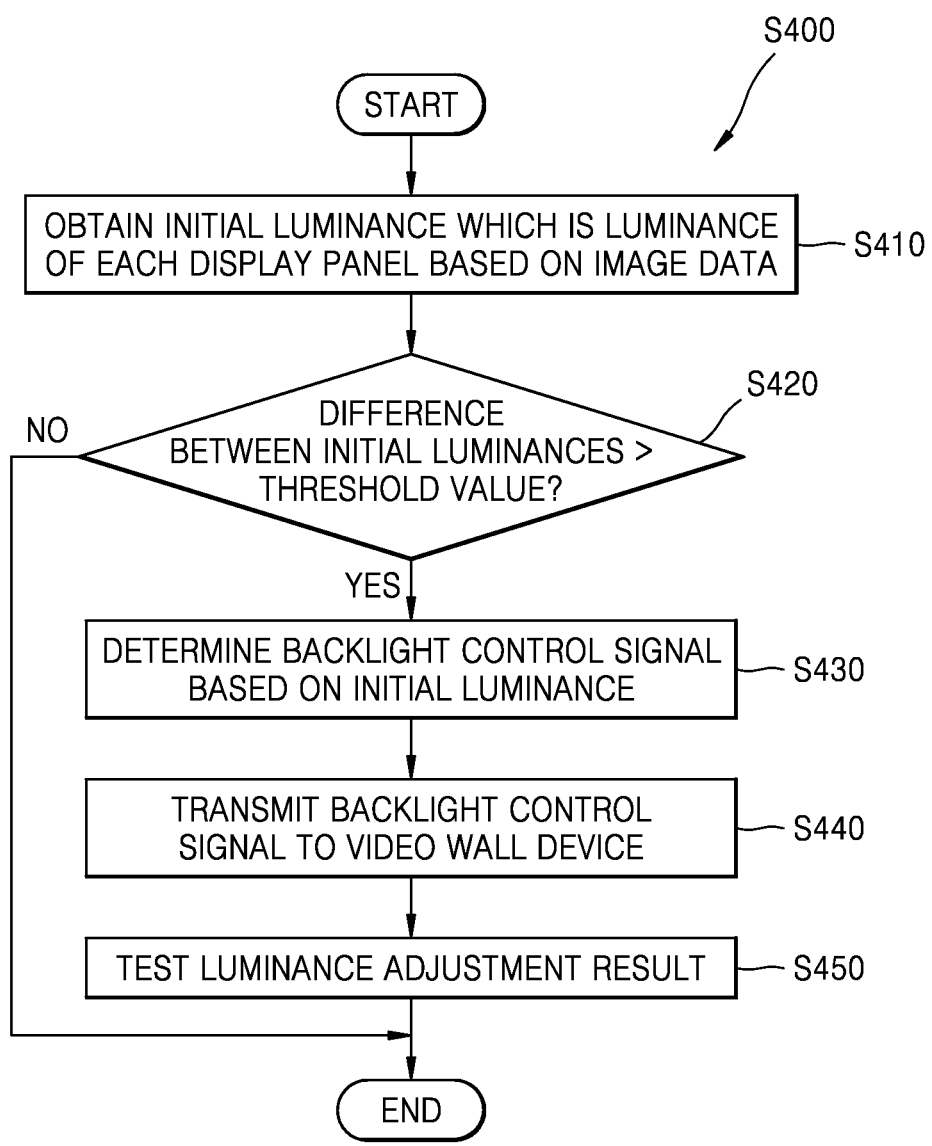
FIG. 5 is a flowchart illustrating an example method of operation of the video wall control device of FIG. 1.

FIG. 5 is a flowchart illustrating an example method of operation of a video wall control device 300 of FIG. 1. The method S400 of FIG. 5 may be an example different from the method S300 of the video wall control device 300 shown in FIG. 4. Because the method S300 of FIG. 4 is applied to the method S400 of FIG. 5 unless otherwise described, duplicate description will be omitted.

Referring to FIGS. 1 and 5, the video wall control device 300 may obtain the initial luminance which is the luminance of each display panel 110 based on the image data (S410). The video wall control device 300 may compare the difference between the initial luminances of the display panels 110 with the threshold value (S420). When the difference between the initial luminances of the display panels 110 is equal to or smaller than the threshold value, the video wall control device 300 may end an operation of controlling the backlight units 120 in order to adjust the luminances of the display panels 110. When the difference between the initial luminances of the display panels 110 is greater than the threshold value, the video wall control device 300 may determine the backlight control signal based on the initial luminance of each display panel 110 (S430).

The video wall control device 300 may transmit the backlight control signal to the video wall device 100 (S440). The video wall device 100 may control the intensity of the light supplied by at least one backlight unit among the plurality of backlight units 120 based on the backlight control signal. For example, the video wall control device 300 may adjust the luminance of the video wall device 100 by controlling the backlight units 120.

The video wall control device 300 may test a luminance adjustment result of the video wall device 100 (S450).

Figure 6:
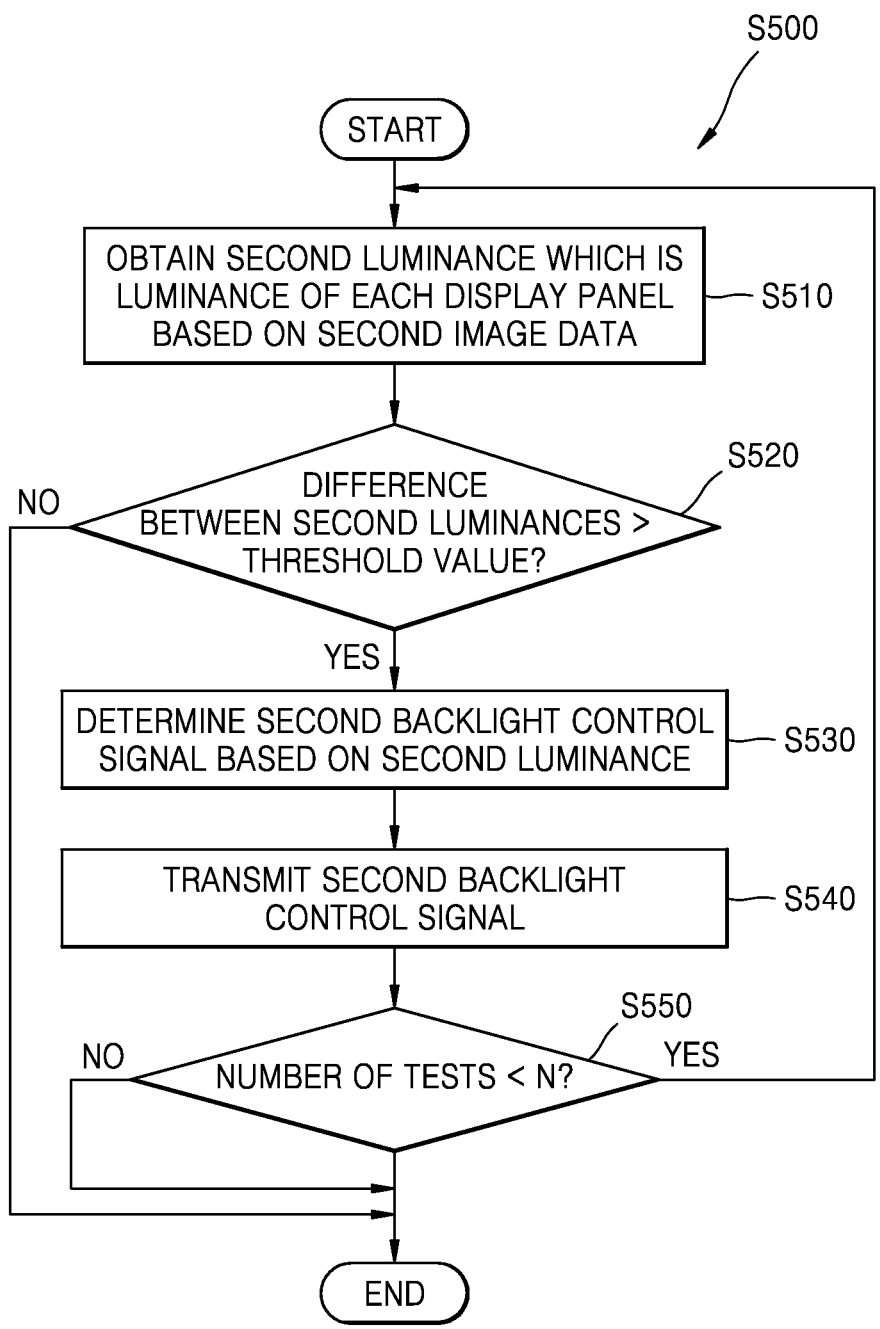
FIG. 6 is a flowchart illustrating an example method of testing a luminance adjustment result of the video wall control device of FIG. 1.

FIG. 6 is a flowchart illustrating an example method of testing a luminance adjustment result of a video wall control device 300 of FIG. 1. A method of testing the luminance adjustment result of FIG. 6 (S500) may be included in an operation of testing the luminance adjustment result of FIG. 5 (S450).

Referring to FIGS. 1 and 6, the video wall control device 300 may obtain a second luminance which is a luminance of each display panel 110 based on second image data obtained by again capturing the video wall device 100 in which at least one backlight unit is controlled based on the backlight control signal (S510).

The video wall control device 300 may compare the difference between the second luminances of the display panels 110 with the threshold value in order to determine whether to readjust the plurality of backlight units 120 based on the second luminance (S520). The threshold value may be equal to the threshold value which is compared with the difference between the initial luminances in S420 of FIG. 5. When the difference between the initial luminances of the display panels is equal to or smaller than the threshold value, the video wall control device 300 may end the test on the luminance adjustment result.

When the difference between the second luminances of the display panels 110 is greater than the threshold value, the video wall control device 300 may opt to readjust the plurality of backlight units 120. When the readjustment is selected, the video wall control device 300 may determine a second backlight control signal controlling the intensity of the light supplied by at least one backlight unit among the plurality of backlight units 120 (S530). The video wall control device 300 may transmit the second backlight control signal to the video wall device 100 (S540).

The video wall control device 300 may compare the number of tests performed with a predetermined number N (S550). When the number of tests is smaller than the predetermined number N, the video wall control device 300 may repeatedly test the luminance adjustment result by performing the operations S510 to S540 again. When the number of tests is equal to the predetermined number N, the video wall control device 300 may end the test on the luminance adjustment result.

Figure 7:
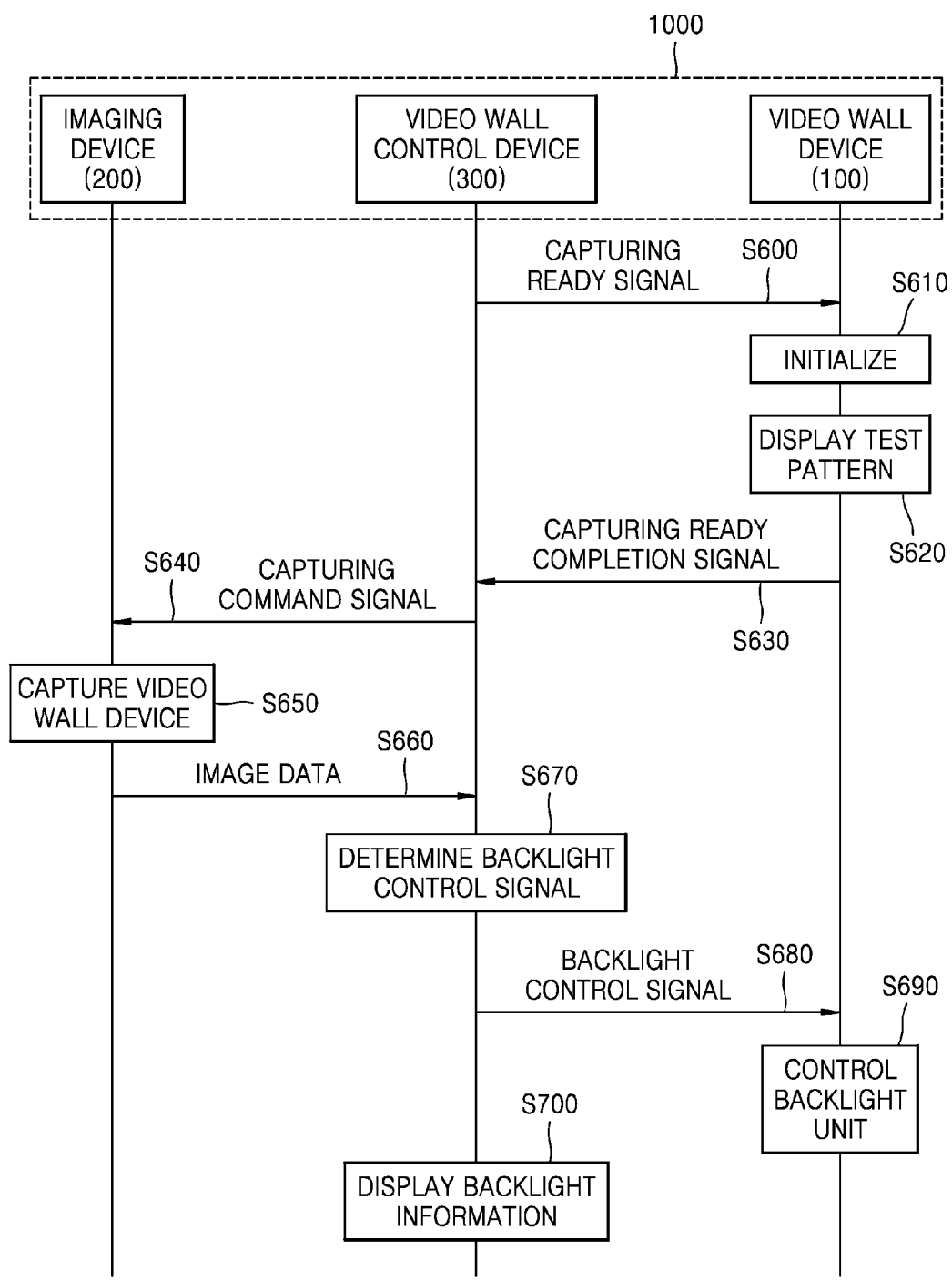
FIG. 7 is a flowchart illustrating an example method of operation of the video wall system of FIG. 1.

FIG. 7 is a flowchart illustrating an example method of operation of a video wall system 1000 of FIG. 1. Since the contents described above are able to be applied to the method of the video wall system, duplicate description will be omitted.

Referring to FIGS. 1 and 7, the video wall control device 300 may transmit a capturing ready signal to the video wall device 100 (S600).

The video wall device 100 receiving the capturing ready signal may initialize various settings of the video wall device 100 (S610). The video wall device 100 receiving the capturing ready signal may initialize the intensity of the light supplied by each backlight unit 120 to each display panel 110. Due to the initialization, each backlight unit 120 may supply the light having the intensity of the light set as the default. For example, the intensity of the light supplied by each backlight unit 120 may be initialized as the maximum value.

Further, the plurality of display panels 110 of the video wall device 100 receiving the capturing ready signal may display a test pattern (S620). The test pattern may be a white pattern or a gray pattern. The test pattern may be a patch pattern in which the white pattern or the gray pattern is displayed only on a portion of a screen of each display panel 110.

When the test pattern is displayed on the display panels 110, the video wall device 100 may transmit a capturing ready completion signal to the video wall control device 300 (S630). The video wall control device 300 receiving the capturing ready completion signal may transmit a capturing command signal to the imaging device 200 (S640). The imaging device 200 receiving the capturing command signal may obtain image data by capturing an image of the video wall device 100 (S650). Before capturing, the imaging device 200 may initialize or reset various settings of the imaging device 200 based on the capturing command signal.

However, the capturing ready signal (S600), the capturing ready completion signal (S630), and the capturing command signal (S640) of FIG. 7 are examples, and do not limit other alternatives. The video wall system 1000 may be diversely implemented to perform the operations (S610, S620) of the video wall device 100, and the operation (S640) of the imaging device 200 using a signal transmission method different from that of FIG. 7, e.g., a timer, etc.

The video wall control device 300 may receive the image data from the imaging device 200 (S660). The video wall control device 300 may determine the backlight control signal based on the image data (S670). The contents described in FIGS. 3 to 6 may be applied to the operation S670. The video wall control device 300 may transmit the backlight control signal to the video wall device 100 (S680).

The video wall device 100 may control the backlight units 120 based on the backlight control signal (S690). For example, the video wall device 100 may control the intensity of the light supplied by at least one backlight unit among the plurality of backlight units 120 to at least one corresponding display panel among the plurality of display panels 110.

Although not shown in FIG. 7, the video wall control device 300 may test the luminance adjustment result of the video wall device 100 as shown in FIGS. 5 and 6. For this, the imaging device 200 may capture the image of the video wall device 100 again and obtain the second image data. When capturing the video wall device 100 again, the backlight units 120 of the video wall device 100 may supply the light having the adjusted intensity based on the backlight control signal, and the plurality of display panels 110 may display the test pattern.

The video wall control device 300 may display the backlight information which is information on the intensity of the light supplied by the plurality of backlight units 120 controlled based on the backlight control signal (S700). The user may check the intensity of the light supplied by the plurality of backlight units 120 controlled by the video wall control device 300 through the displayed backlight information. Further, the video wall control device 300 may receive an input for resetting the backlight information from, for example, the user. Through this, the user may reset the intensity of the light of the backlight units 120 which is previously controlled by the video wall control device 300.

According to the example, the video wall control device 300 may adjust the intensity of the light supplied by the backlight units 120 based on the image data obtained by capturing the image of the video wall device 100. For example, the luminances of the display panels 110 may be adjusted. After the luminances of the display panels 110 are adjusted by the control of the backlight units 120, the video wall control device 300 may perform another calibration operation such as chromaticity adjustments among the display panels 110, and luminance adjustments through data gain adjustments. For example, when decreasing a data gain of the display panel, the luminance of the display panel may be decreased.

Figure 8:
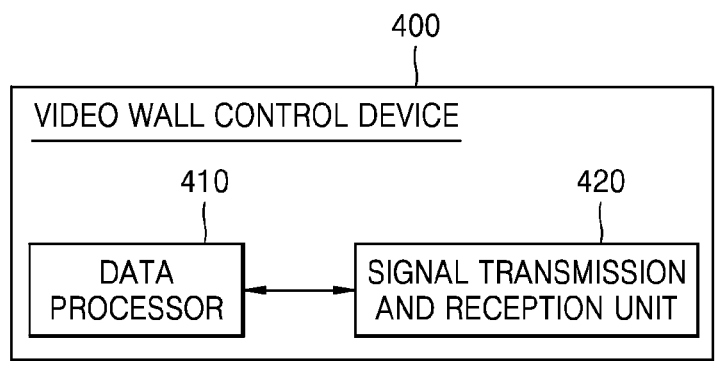
FIG. 8 illustrates a configuration of an example video wall control device.

FIG. 8 illustrates a configuration of an example video wall control device 400. The video wall control device 400 of FIG. 8 may be an example of the video wall control device 300 shown in FIG. 1. The contents with respect to the video wall control device 300 described above may be applied to the video wall control device 400 of FIG. 8.

Referring to FIGS. 1 and 8, the video wall control device 400 may include a data processor 410, and a signal transmission and reception unit in, for example, the form of signal transmission and reception circuitry 420.

The data processor 410 may be configured to determine the backlight control signal based on the image data obtained by capturing the image of the video wall device 100. The backlight control signal may, for example, be a signal controlling the intensity of the light supplied by at least one backlight unit among the plurality of backlight units 120. The contents described above may be applied to an operation of determining the backlight control signal based on the image data performed in the data processor 410. The data processor 410 may be implemented as various devices such as, for example, a central processor (CPU), a microprocessor, a graphic processor (GPU), etc.

The signal transmission and reception unit or circuitry 420 may be configured to transmit a signal to the video wall device 100 or the imaging device 200, or receive a signal from the video wall device 100 or the imaging device 200. The signal transmission and reception unit or circuitry 420 may receive the image data obtained by capturing the image of the video wall device 100 from the imaging device 200. Further, the signal transmission and reception unit or circuitry 420 may transmit the backlight control signal to the video wall device 100. The signal transmission and reception unit or circuitry 420 may include one or more elements capable of communicating with an outside device in various communication manners.

Figure 9:
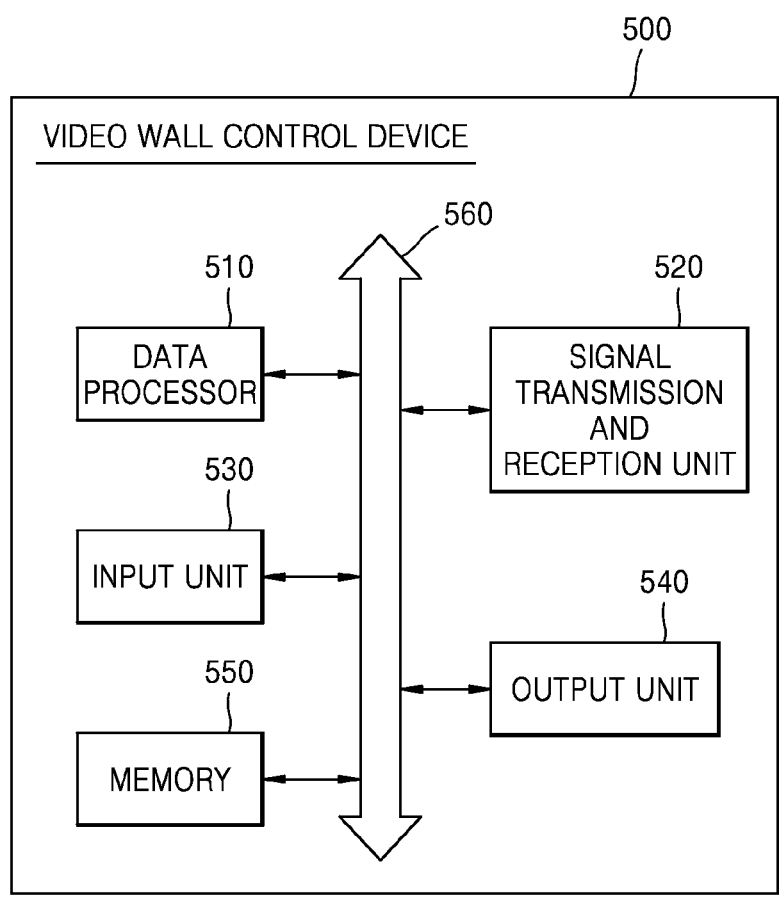
FIG. 9 illustrates a configuration of an example video wall control device.

FIG. 9 illustrates a configuration of an example video wall control device 500. The video wall control device 500 of FIG. 9 may be an example of the video wall control device 300 shown in FIG. 1, and another example of the video wall control device 400 shown in FIG. 8. Accordingly, the content with respect to the video wall control devices 300 and 400 described above may be applied to the video wall control device 500 of FIG. 9.

Referring to FIGS. 1 and 9, the video wall control device 500 may include a data processor 510 and a signal transmission and reception unit or circuitry 520. The data processor 510 may determine the backlight control signal based on the image data obtained by capturing the image of the video wall device 100. The signal transmission and reception unit or circuitry 520 may receive the image data from the imaging device 200. Further, the signal transmission and reception unit or circuitry 520 may transmit the backlight control signal to the video wall device 100.

The video wall control device 500 may further include an input or input unit 530, an output or output unit 540, and a memory 550. Various elements included in the video wall control device 500 may be mutually connected through a bus 560. The input or input unit 530 and the output or output unit 540 may provide a user interface (UI) for a manipulation of the video wall system 1000 to the user.

The memory 550 may store a variety of information needed for a control of the video wall system 1000. The memory 550 may, for example, store the backlight information which is information on the intensity of the light supplied by each backlight unit 120. The stored backlight information may be information on the intensity of the light supplied by each backlight unit 120 controlled based on the backlight control signal.

The input or input unit 530 may receive a command for the manipulation of the video wall system 1000, and a variety of information related to the operation of the video wall system 1000 from the user. A keyboard, a mouse, a touch screen, a voice recognition device, a fingerprint recognition device, an iris recognition device, etc. may be included in an example of the input or input unit 530, and various input devices which will be apparent to one of ordinary skill in the art may be included.

The input or input unit 530 may receive information for setting the reference luminance or information for selecting the reference display panel, etc. from the user. In this case, the data processor 510 may be configured to determine the backlight control signal so that the luminance of at least one display panel among the plurality of display panels 110 is adjusted from the initial luminance to the reference luminance set by the user.

The output or output unit 540 may output the UI, and output information needed by the user for manipulating the video wall system 1000, such as setting information, etc. of the video wall device 100 or the imaging device 200. A speaker, a printer, a cathode ray tube (CRT) display, a liquid crystal display (LCD), a plasma display panel (PDP) display, an organic light emitting diode (OLED) display, a field emission display (FED), a three-dimensional (3D) display, a transparent display, etc. may be included in an example of the output or output unit 540, and various output devices which will be apparent to one of ordinary skill in the art may be included.

The output or output unit 540 may display the backlight information which is information on the intensity of the light supplied by each backlight unit 120. The displayed backlight information may be information on the intensity of the light supplied by each backlight unit 120 controlled based on the backlight control signal. The user may check the intensity of the light supplied by each backlight unit 120 controlled by the video wall control device 300 through the displayed backlight information.

Further, the input or input unit 530 may receive an input for resetting the displayed backlight information from the user. Through this, the user may readjust the intensity of the light of each backlight unit 120 which was previously controlled by the video wall control device 300.

Figure 10:
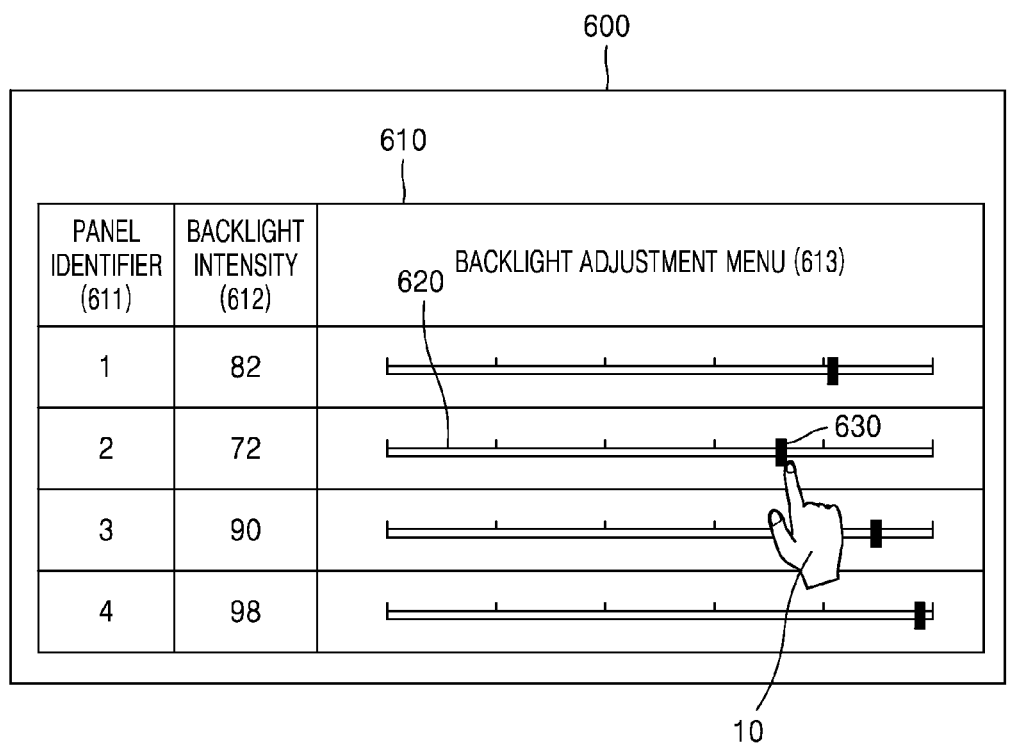
FIG. 10 illustrates a screen of an output of a video wall control device.
Figure 11:
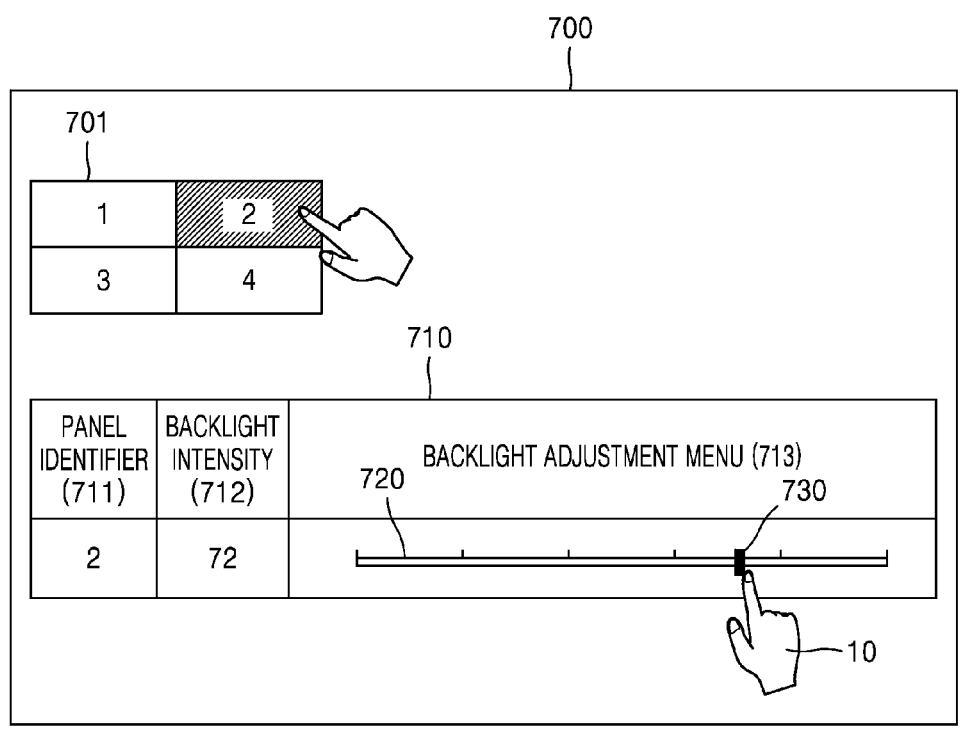
FIG. 11 illustrates a screen of an output of a video wall control device.

In FIGS. 10 and 11, an example in which the output or output unit 540 displays the backlight information and an example in which the user readjusts the intensity of the light of each backlight unit 120 through the input or input unit 530 will be described.

FIG. 10 illustrates a screen 600 of an output unit of an example video wall control device 500. The screen 600 of FIG. 10 may be the screen of the output or output unit 540 of the video wall control device 500 of FIG. 9.

Referring to FIGS. 1 and 10, the screen 600 may display the backlight information 610 which is information on the intensity of the light supplied by each backlight unit 120. The backlight information 610 may, for example, include a panel identifier 611 which is identification information of the display panels 110, and a backlight intensity 612 representing information on the intensity of the light of each backlight unit 120. The backlight information 610 may further include a backlight adjustment menu 613 capable of adjusting the intensity of the light of each backlight unit 120.

When the panel identifier 611 is a number "1," it may, for example, represent the first display panel 110-1 among the display panels 110 of FIG. 1, when the panel identifier 611 is a number "2," it may, for example, represent the second display panel 110-2, when the panel identifier 611 is a number "3," it may, for example, represent the third display panel 110-3, and when the panel identifier 611 is a number "4," it may, for example, represent the fourth display panel 110-4. The panel identifier 611 of FIG. 10 is merely an example, and the panel identifier 611 may be represented in various manners in which the user is able to identify whether it represents any one among the display panels (110 of FIG. 1).

The backlight intensity 612 may, for example, represent the information on the intensity of the light of the backlight units 120 in the form of numbers. For example, the backlight intensity 612 may be represented as one among natural numbers from 1 to 100 according to a degree of the intensity of the light. As the intensity of the light increases, a number representing the backlight intensity 612 may increase. The backlight intensity 612 may represent the information on the intensity of the light which is currently set in each backlight unit 120. For example, when the intensity of the light supplied by each backlight unit according to the backlight control signal obtained based on the image data is adjusted, the backlight intensity 612 may, for example, represent the information on the intensity of the light of each backlight unit 120 adjusted according to the backlight control signal.

The backlight adjustment menu 613 may, for example, include an adjustment bar 620 representing an adjustable range of the intensity of the light, and an adjustment button 630 capable of adjusting the intensity of the light. The user may adjust the intensity of the light of each backlight unit 120 by adjusting a position of the adjustment button 630 in the adjustment bar 620. For example, when the input or input unit (530 of FIG. 9) of the video wall control device (500 of FIG. 9) includes a touch screen, the touch screen may be integrally implemented with the output unit (540 of FIG. 9). In this case, the user 10 may adjust the intensity of the light by dragging the adjustment button 630 in the adjustment bar 620.

The backlight intensity 612 may be synchronized with the backlight adjustment menu 613. For example, a position of the adjustment button 630 may be changed by the user 10, and the intensity of the light represented in the backlight intensity 612 may also be simultaneously changed to the intensity of the light corresponding to the position of the adjustment button 630. For example, when the user 10 drags the adjustment button 630 to the right, the backlight intensity 612 of the display panel having the number "2" may be increased more than "72."

The backlight information 610 displayed on the screen 600 of FIG. 10 is merely an example. The backlight intensity 612 may be displayed on the screen 600 by being diversely implemented so that the user 10 can recognize information on the intensity of the light of each backlight unit 120 which is set or adjusted. The backlight adjustment menu 613 may be displayed on the screen 600 by being diversely implemented so that the user 10 can adjust the intensity of the light of each backlight unit 120. Further, an input method in which the user adjusts the intensity of the light of each backlight unit 120 through the backlight adjustment menu 613 may also be implemented in various manners such as a touch, a click, a drag, etc.

FIG. 11 illustrates a screen 700 of an output or output unit of an example video wall control device. The screen 700 of FIG. 11 may be the screen of the output unit 540 of the video wall control device 500 of FIG. 9.

Referring to FIGS. 1 and 11, the screen 700 may display a panel selection menu 701 configured to select one display panel among a plurality of display panels 110 and backlight information 710 which is the information on the intensity of the light of the backlight unit corresponding to the selected display panel.

The panel selection menu 701 may, for example, include icons (numbers 1, 2, 3, 4) capable of selecting each display panel 110. In FIG. 11, a shape of the panel selection menu 701 including the icons (numbers 1, 2, 3, 4) may be implemented in a shape in which the display panels (110 of FIG. 1) included in the video wall device 100 are arranged, but FIG. 11 is merely an example. The panel selection menu 701 may be represented in various manners in which the user 10 is able to identify and select any one display panel among the display panels 110.

As an example shown in FIG. 11, the user 10 may select the second display panel 110-2 of FIG. 1 by selecting the icon having the number "2" in the panel selection menu 701. The user 10 may select one display panel through the panel selection menu 701 in various manners such as a touch, a click, etc. The icon having the number "2" of the panel selection menu 701 selected by the user 10 may be displayed differently from other icons (numbers 1, 3, 4) which are not selected.

The backlight information 710 displayed on the screen 700 may represent information on the intensity of the light of the second backlight unit 120-2 corresponding to the second display panel 110-2 selected through the panel selection menu 701.

The backlight information 710 may include a panel identifier 711 which is identification information of the selected display panel and a backlight intensity 712 representing the information on the intensity of the light of a corresponding selected backlight unit. The backlight information 710 may further include a backlight adjustment menu 713 capable of adjusting the intensity of the light of the selected backlight unit. The backlight adjustment menu 713 may include an adjustment bar 720 representing an adjustable range of the intensity of the light and an adjustment button 730 capable of adjusting the intensity of the light. The user 10 may adjust the intensity of the light of the selected backlight unit by adjusting a position of the adjustment button 730 in the adjustment bar 720. At this time, the backlight intensity 712 may be synchronized with the backlight adjustment menu 713.

Figure 12:
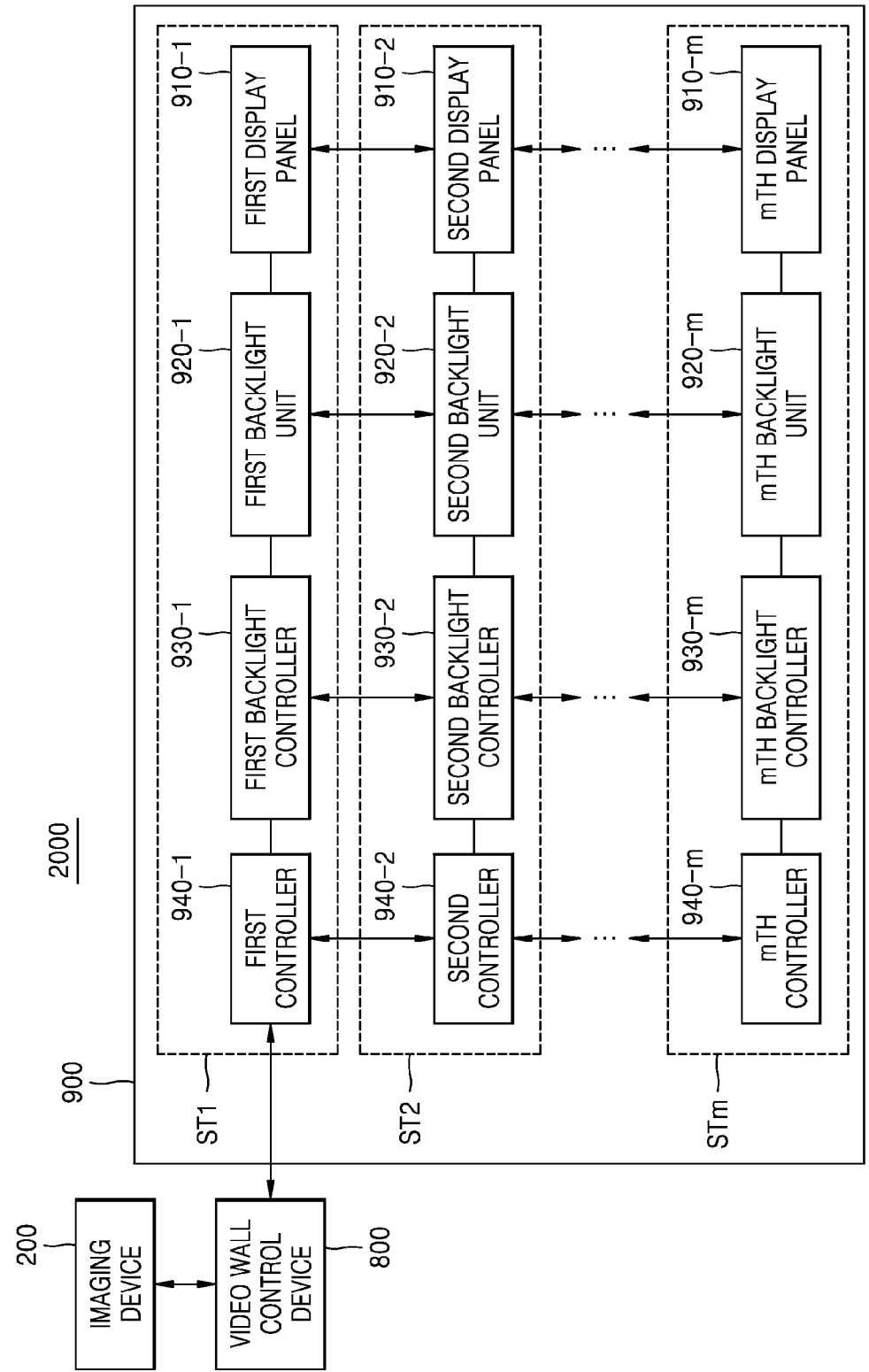
FIG. 12 illustrates a configuration of an example video wall system.

FIG. 12 illustrates a configuration of an example video wall system 2000.

Referring to FIG. 12, the video wall system 2000 may include a video wall device 900, a video wall control device 800, and an imaging device 200. The imaging device 200 of FIG. 12 may, for example, be the imaging device 200 shown in FIG. 1, and the video wall control device 800 may be the video wall control device 300, 400, or 500 of FIG. 1, 8, or 9. Further, the video wall device 900 may be another example of the video wall device 100 of FIG. 1. Accordingly, the content described above may be applied to the video wall system 2000 of FIG. 12.

The video wall device 900 may include a plurality of display panels 910-1 to 910-m, and a plurality of backlight units 920-1 to 920-m. The video wall device 900 may further include a plurality of backlight controllers 930-1 to 930-m, and a plurality of controllers 940-1 to 940-m. FIG. 12 is merely an example of the video wall device 900, the plurality of backlight controllers 930-1 to 930-m may, for example, be implemented as one integrated backlight controller, and the plurality of controllers 940-1 to 940-m may also be implemented as one integrated controller.

A configuration of the nth display panel 910-n, the nth backlight unit 920-n, the nth backlight controller 930-n, and the nth controller 940-n may be referred to as a set (n=1, 2, . . . , m). Accordingly, the video wall device 900 may include m sets ST1 to STm which is the same number as the plurality of display panels 910-1 to 910-m.

The first controller 940-1 of the first set ST1 which is one among the sets ST1 to STm may receive a signal from the video wall control device 800. The video wall device 900 may further include a signal transmission and reception unit or circuitry (not shown) configured to receive a signal from the video wall control device 800. The first controller 940-1 may transmit a signal to the second controller 940-2, and the second controller 940-2 may transmit a signal to the third controller 940-3. Thus, one among the sets ST1 to STm may receive a signal from the video wall control device 800, and the signal may be sequentially transmitted among the sets ST1 to STm. The first controller 940-1 of the first set ST1 may, for example, receive the backlight control signal from the video wall control device 800. The backlight control signal may be transmitted to the mth controller 940-m by, for example, being sequentially transmitted from the first controller 940-1 to the second controller 940-2, and from the second controller 940-2 to the third controller 940-3. FIG. 12 illustrates an example of a signal transmission method among the sets ST1 to STm or a connection relation of the sets ST1 to STm. The sets ST1 to STm may be configured to receive the backlight control signal simultaneously.

Each of the controllers 940-1 to 940-m may extract the information of the intensity of the light supplied by each of the backlight units 920-1 to 920-m based on the backlight control signal. For example, the nth controller 940-n included in the nth set STn may extract the information of the intensity of the light supplied by the nth backlight unit 920-n.

Each of the backlight controllers 930-1 to 930-m may control the intensity of the light supplied by each of the backlight units 920-1 to 920-m based on the information of the intensity of the light. For example, the nth backlight controller 930-n may control the intensity of the light supplied by the nth backlight unit 920-n to the nth display panel 910-n based on the information on the intensity of the light.

Further, each of the controllers 940-1 to 940-m may be configured so that each of the display panels 910-1 to 910-m displays an image. Each of the controllers 940-1 to 940-m may be implemented as various devices such as a CPU, a microprocessor, a GPU, etc.

Therefore, according to the examples, the backlight unit may be controlled based on the image data obtained by capturing the image of the video wall device. Through this, the luminances among the plurality of display panels may be adjusted.

A case according to the examples has an advantage compared with a case of performing the luminance adjustment using a spectrophotometer. Since a spectrophotometer is considerably expensive and can only perform accurate measurement when a measurement environment is a dark room, it is difficult to use at an actual site. Further, when using a spectrophotometer, there is an inconvenience in that the user should move the spectrophotometer whenever she or he manually measures the luminance of each display panel. Moreover, as the number of display panels included in the video wall device is increased, a time for the luminance adjustment may increase and the inconvenience of the user may increase. On the other hand, according to the examples, the luminance adjustment may be automatically performed based on the image data obtained by capturing the image of the video wall device. Also, since the image data is obtained by capturing the image of the video wall device once regardless of the number of display panels included in the video wall device, the luminance adjustment time may be remarkably decreased compared with a case of using the spectrophotometer. Further, the imaging device for obtaining the image data is cheaper than using the spectrophotometer. Accordingly, according to the examples, a time and a cost needed for the luminance adjustment may be decreased compared with the case of using the spectrophotometer, and convenience of the user may be increased. Further, according to the examples, accuracy of the luminance adjustment may be sufficient for color deviations visible to the naked eye to be removed or decreased.

Further, when adjusting the luminances among the display panels by controlling the backlight unit according to the examples, there is an advantage compared with a case of adjusting the luminances among the display panels as only data gain adjustment. When decreasing the luminance of the display panel by decreasing the data gain, side effects such as degradation of gray scale expressiveness or loss of data information may occur due to a data change by the data gain. On the other hand, when adjusting the luminance of the display panel by the control of the backlight unit according to the examples, deterioration of image quality may be prevented or reduced by minimizing or reducing the side effects. Moreover, when comparing a case of decreasing the luminance by decreasing only the data gain without changing the intensity of the light of the backlight unit with a case of decreasing the luminance by decreasing the intensity of the light of the backlight unit according to the examples, power consumption of the video wall device can be decreased in the case according to the examples.

Meanwhile, the examples can be implemented as computer programs and can be implemented in general-use digital computers that execute the programs using computer readable recording media.

Examples of the computer readable recording media include magnetic storage media (e.g., ROM, floppy disks, hard disks, etc.) and optical recording media (e.g., CD-ROMs, or DVDs).

While one or more examples have been described with reference to the accompanying drawings, it will be understood by those of ordinary skill in the art that various changes in form and details may be made therein without changing the technical spirit or essential features. Therefore, it should be understood that examples described herein should be considered in a descriptive sense only and not for purposes of limitation.

What is claimed is:

1. A video wall control device, comprising:
a data processor configured to obtain image data acquired by capturing an image of a video wall device including a plurality of display panels and a plurality of backlight units supplying light to each of the plurality of display panels, obtain a plurality of initial luminances, which are respective luminances of the plurality of display panels, based on the image data acquired by capturing the image of the video wall device, and determine a backlight control signal for controlling an intensity of light supplied by at least one backlight unit among the plurality of backlight units based on the plurality of the initial luminances; and
signal transmission and reception circuitry configured to transmit the backlight control signal to the video wall device,
wherein the data processor is configured to select one among the plurality of display panels as a reference display panel, and to determine one of the plurality of initial luminances corresponding to of the reference display panel as a reference luminance.

2. The video wall control device of claim 1, wherein the data processor is configured to select the reference display panel based on a selection of a user, or to select a display panel having the smallest initial luminance among the plurality of display panels as the reference display panel.

3. The video wall control device of claim 1, wherein the data processor is configured to compare a difference between the plurality of initial luminances of the plurality of display panels with a threshold value, and to determine the backlight control signal when the difference is greater than the threshold value.

4. The video wall control device of claim 3, wherein the data processor is configured to obtain a second luminance, the second luminance being the luminance of each of the plurality of display panels based on second image data obtained by capturing another image of the video wall device in which the at least one backlight unit is controlled based on the backlight control signal, and to determine whether to readjust the plurality of backlight units based on the second luminance,
the data processor being further configured so that when it is determined that the plurality of backlight units are to be readjusted, the data processor is configured to determine a second backlight control signal for controlling the intensity of the light supplied by at least one backlight unit among the plurality of backlight units, and
the signal transmission and reception circuitry is configured to transmit the second backlight control signal to the video wall device.

5. The video wall control device of claim 1, wherein the signal transmission and reception circuitry is configured to transmit a capturing ready signal to the video wall device wherein the video wall device performs at least one of an operation of initializing the intensity of the light supplied by the plurality of backlight units before the image of the video wall device is captured, and an operation in which the plurality of display panels display a test pattern before the image of the video wall device is captured.

6. The video wall control device of claim 1, further comprising:
an output configured to display backlight information, the backlight information including information on the intensity of the light supplied by the plurality of backlight units controlled based on the backlight control signal.

7. The video wall control device of claim 6, further comprising:
an input configured to receive an input for resetting the backlight information.

8. A method of controlling a video wall, the method comprising:
obtaining image data acquired by capturing an image of a video wall device including a plurality of display panels and a plurality of backlight units supplying light to each of the plurality of display panels;

obtaining a plurality of initial luminances, which are respective luminances of the plurality of display panels based on the image data acquired by capturing the image of the video wall device;

selecting one among the plurality of display panels as a reference display panel;

determining one of the plurality of initial luminances corresponding to the reference display panel as a reference luminance;

determining a backlight control signal for controlling an intensity of light supplied by at least one backlight unit among the plurality of backlight units based on the plurality of initial luminances, and the reference luminance; and transmitting the backlight control signal to the video wall device.

9. The method of claim 8, wherein the reference display panel is selected based on a selection of a user, or is selected as a display panel having the smallest initial luminance among the plurality of initial luminances.

10. The method of claim 8, wherein the determining of the backlight control signal comprises:

comparing a difference between the plurality of initial luminances of the plurality of display panels with a threshold value; and determining the backlight control signal when the difference is greater than the threshold value.

11. The method of claim 10, further comprising:

obtaining a second luminance, the second luminance being the luminance of each of the plurality of display panels based on second image data obtained by capturing another image of the video wall device in which the at least one backlight unit is controlled based on the backlight control signal;

determining whether to readjust the plurality of backlight units based on the second luminance;

determining a second backlight control signal controlling the intensity of the light supplied by at least one backlight unit among the plurality of backlight units when it is determined to readjust; and transmitting the second backlight control signal to the video wall device.

12. The method of claim 8, further comprising:

transmitting a capturing ready signal to the video wall device wherein the video wall device performs at least one of an operation of initializing the intensity of the light supplied by the plurality of backlight units before the image of the video wall device is captured, and an operation in which the plurality of display panels display a test pattern before the image of the video wall device is captured.

13. The method of claim 8, further comprising:

displaying backlight information, the backlight information including information on the intensity of the light supplied by the plurality of backlight units controlled based on the backlight control signal; and receiving an input for resetting the backlight information.

14. A non-transitory computer readable storage medium in which a program for implementing the video wall control method of claim 8 is recorded.

* * * * *